F. D. SHELDON.
INDUSTRIAL TRACTOR.
APPLICATION FILED JAN. 13, 1917.

1,282,301.

Patented Oct. 22, 1918.
6 SHEETS—SHEET 1.

Inventor
Frank D. Sheldon
By Brown, Hanson & Poettcher
Attorneys.

F. D. SHELDON.
INDUSTRIAL TRACTOR.
APPLICATION FILED JAN. 13, 1917.

1,282,301.

Patented Oct. 22, 1918.
6 SHEETS—SHEET 5.

Inventor
Frank D. Sheldon
By Brown, Hanson & Boettcher
Attorneys.

UNITED STATES PATENT OFFICE.

FRANK D. SHELDON, OF MILWAUKEE, WISCONSIN, ASSIGNOR TO MILWAUKEE LOCOMOTIVE MANUFACTURING COMPANY, OF MILWAUKEE, WISCONSIN, A CORPORATION OF WISCONSIN.

INDUSTRIAL TRACTOR.

1,282,301.   Specification of Letters Patent.   Patented Oct. 22, 1918.

Application filed January 13, 1917. Serial No. 142,283.

*To all whom it may concern:*

Be it known that I, FRANK D. SHELDON, a citizen of the United States, residing at Milwaukee, in the county of Milwaukee and State of Wisconsin, have invented a certain new and useful Improvement in Industrial Tractors, of which the following is a full, clear, concise, and exact description, reference being had to the accompanying drawings, forming a part of this specification.

The present invention relates broadly to motor vehicles and more particularly to an improved, novel and compact tractor or truck, particularly designed and adapted for use in a limited space, either as a transporting device in and of itself, or as a motor or locomotive for pulling a plurality of trailers or the like.

The primary object of my invention is to provide an industrial truck of the class referred to having a novel arrangement of structural elements whereby the power plant may be disposed in a relatively low plane beneath the carrying portion or body of the truck so that a more even distribution of the objects to be transported may be had and a greater carrying space acquired for a given wheel base.

Another object of my invention is to provide a truck of the class described having a relatively short wheel base permitting manipulation of the truck in close quarters and to lighten the dead weight of the truck without materially reducing its carrying capacity.

A further object of my invention is to provide novel and improved means whereby to automatically apply power to the driving wheels and to simultaneously release the brake.

My invention contemplates interconnection of the clutch with the brake rigging so that when the clutch is thrown in the brake will, just prior to such action, be automatically released.

A still further object of my invention is to so arrange the transmission mechanism and power plant that access may be readily had thereto without dismantling the truck.

A still further object of my invention is to dispose the line of draft in alinement with the centers of the wheels so that the connection of a trailer to the tractor will be disposed below the line of draft of the connection to the trailer, whereby to prevent climbing of the front end of the tractor when running light and hauling a heavy trailing load.

A still further object of my invention is to provide a tractor or truck which is strong and durable, powerful, may be cheaply manufactured and economically employed.

Other objects and advantages to be derived from the use of my improved truck not hereinbefore set forth will be apparent from the following detailed description and the claims, taken with an inspection of the accompanying drawings, in which—

Referring more particularly to the drawings, wherein similar characters of reference designate like and corresponding parts throughout the various views, C designates in its entirety the main frame or chassis of my improved truck, said chassis being composed of the side frames $f$ and $f'$, said frames consisting of both top panels 10 and bottom panels 11 connected by vertical posts 12. The forward ends of the chassis frames $f$ and $f'$ are connected by a shielding frame 13, bolts or the like 14 affording means to assure tight connection. The rear ends of the frames $f$ and $f'$ are connected by means of a transverse bar 15, bolts or the like 16 affording connection between the ends of the bar and the end post of said side frame. It will be seen that in the provision of the chassis as shown, a durability and rigidity of structure is afforded sufficient to withstand the shock incident to the use of the device.

The chassis is mounted on steering and driving wheels 17 and 18, respectively. The former are mounted on standard stub axles 19 which are in turn pivoted at 20 to the free ends of the usual floating front axle 21, the latter being usably disposed in connection with the lower panels 11 of the frames $f$ and $f'$ by means of semi-elliptical springs 22, the free ends of said springs being connected in any suitable manner to the lower panels 11 of said side frame, as indicated at 23. Lateral movement of the steering wheel is effected by the usual arms 24, the free ends of said arms being connected by the usual transverse reach rod 25, which latter is suitably connected to steering control mechanism described in detail hereinafter.

Of course, it will be understood that any other approved method of steering the front wheels may be employed, I am not limiting myself to the exact arrangement of the steering wheels.

The driving wheels 18 are mounted on suitable rigid axles 27, said axles being carried rigidly in enlarged portion 28 of the lower panels 11 of the side frames f and f'. The driving wheels 18 receive power from the rear axle 29 and associating mechanism to be described in detail hereinafter.

A protective casing 30 surrounds the axle 29, the free ends of said casing being bolted as at 31 to the lower panels 11 of the side frame. The intermediate portion of the housing 30 is enlarged as at 32 to form the differential casing. The casing 32 is open on both sides, a concavo-convex cap 33 serving to close one side of said differential casing. Bolts or the like 34 serve to prevent displacement of said cap 33.

In order to support a driver or operator, a platform P is provided, said platform being supported by an extension of the chassis C, said extension being designated at c and composed of side portions 35 formed by extending the lower panels 11 of the side frames f and f'. The free ends of the extension 35 are connected by an arcuate transverse bar 36. A draft eye or coupling 37 is disposed at the central portion of said arcuate bar 36, said eye being in alinement with the longitudinal axis of the truck. The lower panels 11 are distorted downwardly as at 38 so that the extensions 35 will be dropped into alinement with the center of the axle of the truck. The platform P may be formed of a wooden plank or the like mounted on arms 40, which latter are pivoted at 41 to the bottom panels 11 of the side frames f and f'. A pair of coil springs 42 or the like are disposed beneath the platform P upon suitable lugs 43 carried by the extension 35 of the extension chassis c. In this manner the operator is afforded a shock absorbing support so that he will not be subject entirely to the shocks imparted to the frame through the rigid mounting of the driving wheels.

Any desired type of body may be installed on the top of the chassis C. However, I prefer to provide a flat body having a section 45 rigidly clamped to the frames f and f' and a movable section 46 hingedly connected as at 47 to the section 45. Guard members 48 are provided along the margins of the sections 45 and 46 to prevent objects from being displaced.

The power plant of my improved truck embodies preferably an internal combustion engine 50 of any improved type as generally used in motor vehicle work. The engine 50 is supported at its forward end in a transverse stirrup or frame 51, the free ends of the frame being connected at 50' to the bottom panels 11 of the side frames f and f'. The crank case 52 of the engine is extended to provide a housing 53 for the clutch which latter is of any improved design, no detail showing of the same being herein made.

Figure 4:
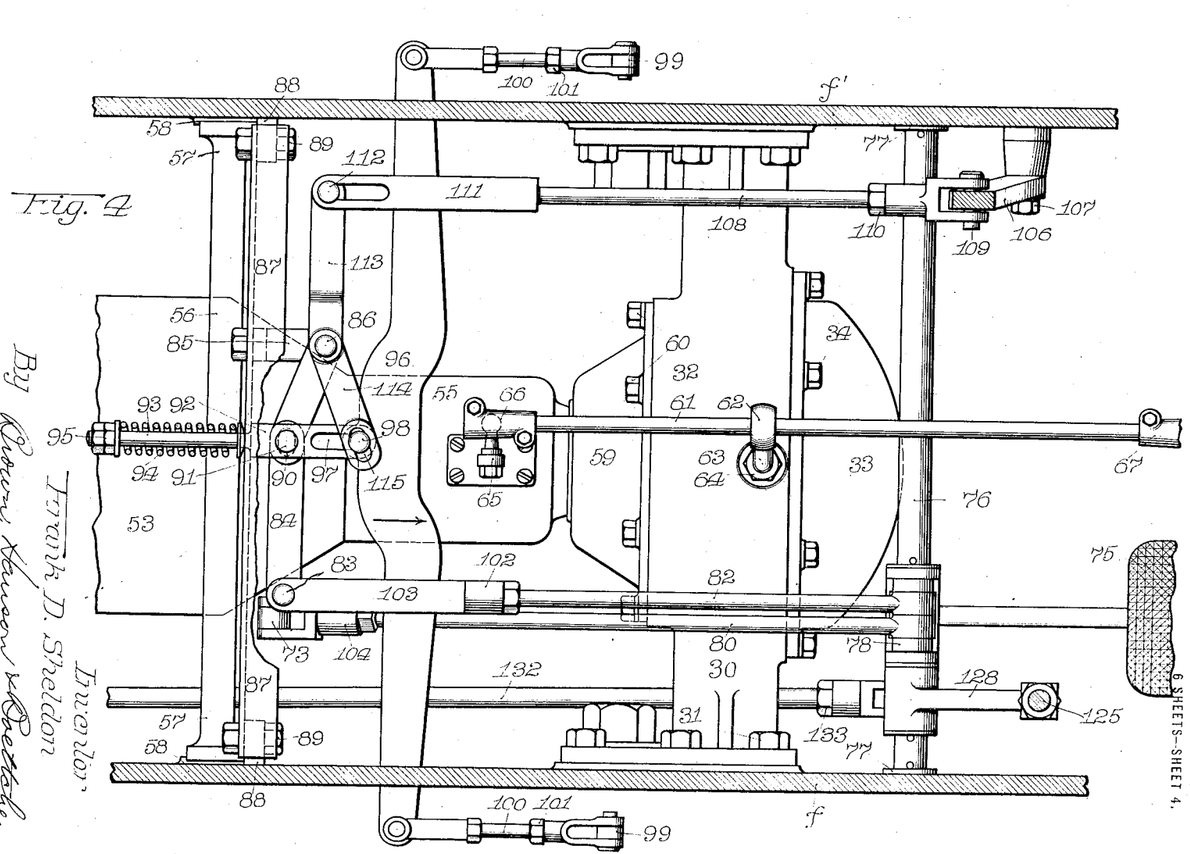
Figs. 4 and 5 are, respectively, enlarged top and side elevations of the control mechanism for the clutch, brake and transmission mechanisms.

The clutch casing 53 is formed with a reduced portion 55 which serves to house the transmission gearing (not shown). A circular frame 56 is disposed about the clutch housing 53 and is provided with arms 57 which are bolted or otherwise secured as at 58 to the lower panels 11 of the side frames f and f', as best shown in Fig. 4.

The transmission casing 55 is connected to the differential housing 32, a flared portion 59 being formed on said transmission housing, the free end of said flared portion being connected to the differential housing by means of bolts 60 or the like.

The transmission gearing contained in the housing 55 is controlled by the gear shift rod 61, which latter is mounted for universal movement in an eye 62, said eye being carried by the upper end of the rod 63 connected by means of a nut 64 to the upper portion of the differential housing 32. The inner free end of the rod 61 is connected to the gear control lever 65 which projects from the transmission housing, said connection being in the form of a universal joint generally designated 66. A similar joint 67 is had between the outer free end of the rod 61 and the hand gear shift lever 68. The lever 68 is pivotally mounted at 69, in a rotative bearing 70, said bearing 70 being carried in a bracket 71 preferably cast integrally with the transverse bar 15 hereinbefore described. By manipulation of the lever 68 the various necessary gear shifting functions may be performed. The transmission gearing proper has not been shown in view of the fact that the same does not in any manner affect or go to make up the invention, and no detail description of the same will be made in view of the fact that any standard approved type of gearing may be employed.

Referring now to the clutch and brake mechanism, I have provided means to engage and disengage a clutch, the clutch structure being substantially the same as the ordinary friction clutch and its operation identical therewith, with the exception that the operating mechanism must be actuated to throw in the clutch instead of release as is now common in motor vehicle practice.

Figure 5:
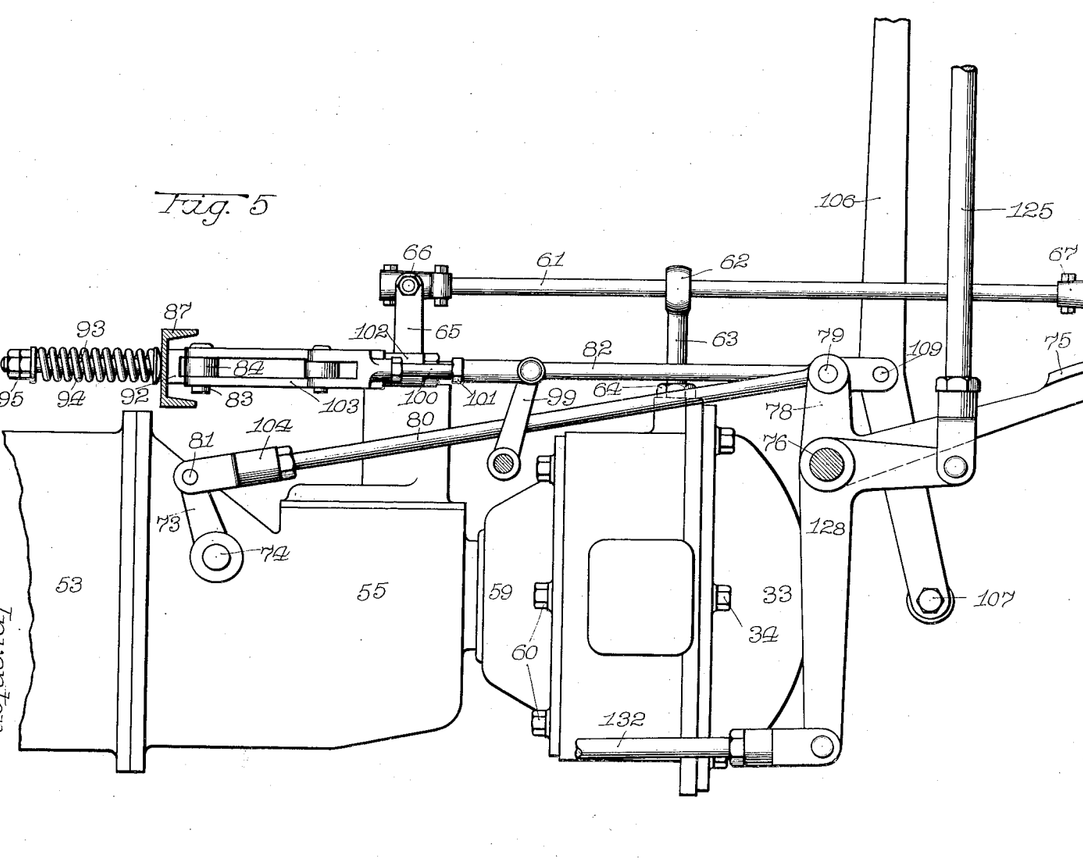

Referring to Figs. 4 and 5, wherein the clutch and brake operating mechanism is best shown, a lever 73 is arranged externally of the clutch housing 53, said lever being mounted on a shaft 74 which may be connected in any suitable manner to the clutch within the housing to shift the same upon an oscillating movement of said lever. Actuation of the lever 73 is had by means of a pedal 75 in the form of a bell crank lever, said pedal being pivotally mounted on a transverse rod 76, the latter being rigidly mounted as at 77 in the lower panels 11 of the side frames. The short arm 78 is pivotally connected at 79 with the outer free end of the clutch connecting rod 80, the inner end of said rod being pivotally connected at 81 to the free end of said lever 73. Thus it will be seen that upon a downward thrust of the pedal 75 the arm 73 will be actuated in this instance throwing in the clutch.

Simultaneously with the throwing in or engaging of the clutch the brakes on the driving wheels are released, suitable mechanism being provided to connect said clutch with said brake. Said mechanism preferably includes a brake connecting rod 82 having its outer end connected to the short arm 78 of the pedal 75 on the pin 79. The inner end of the rod 82 is connected as at 83 to the brake link 84, said link having an angular configuration and being pivoted on a bracket 85 as indicated at 86 in Fig. 4. The bracket 85 is mounted on a channel iron 87, arranged transversely of the chassis and connected to lugs 88 preferably cast integrally with the intermediate strengthening post 12. Connection between the channel iron and said lugs is afforded by means of bolts 89 or the like. The link 84 is provided with a slot 90 intermediate the length thereof, said slot engaging a pin 91 carried by the brake jaw 92, said link 84 being disposed between the upper and lower portions of said jaw 92. A spring rod 93 extends from the jaw 92 through the channel iron 87, a coil spring 94 or the like being disposed about said rod 93, one end of the spring abutting one face of the channel iron and the opposite end of the spring abutting the retaining nut 95 carried by the free end of the rod 93. The free end of the jaw 92 embraces the intermediate portion of the brake beam 96, slots 97 being formed in said jaw 92 to accommodate a pin 98 carried by the brake beam.

The brake beam 96 extends transversely of the chassis and the ends thereof are located adjacent the brake band levers 99 and slightly forward thereof. A pair of rods 100 connect the free ends of the brake beam 96 with said brake band levers 99. Adjustment elements 101 are interposed in said rod for an obvious purpose. In order to dispose the elements in an even plane an adjustment member 102 is associated with the rod 82, said member being in the form of a jaw 103 embracing the brake beam. Adjustment of the rod 80 is afforded by means of the member 104. Of course, it is to be understood that the brake bands are provided with suitable release springs so that the normal tendencies of the brakes are to release. Thus, it will be seen that when the clutch is thrown in the link member 84 will be actuated against the tension of the spring 94 to permit movement of the brake beam in the direction of the arrow in Fig. 4 permitting release of the brake. Immediately as soon as the pedal is released the clutch is thrown out and the brakes applied by means of the spring 94.

Under ordinary operating conditions the tension of the spring 94 will be found sufficient to apply the brakes for a service stop, but in the event of an emergency and where it is desired to hold the truck on a grade, I have provided an emergency brake lever designated 106, said lever being pivotally mounted at 107 on the right hand side of the machine to the lower panels of the right hand frame. The connecting rod 108 is pivotally connected at 109 to the lever 106, said rod being provided with an adjustment means 110. The inner end of the rod 108 is bifurcated on a jaw 111 adapted to embrace the brake beam 96, said jaw having its free end pivotally connected at 112 to a brake link 113, said link having a jaw 114 adapted to embrace the bracket 85 and link 84 and the jaws 92 and brake beam 96. The link 113 is pivotally mounted on the pivot point 86 and the free end of said link 113 is provided with slots 115 to engage the pin 98. In using the emergency brake a rearward pull on the lever 106 will impart a forward movement to the brake beam through the link 113 applying the brakes.

Figure 1:
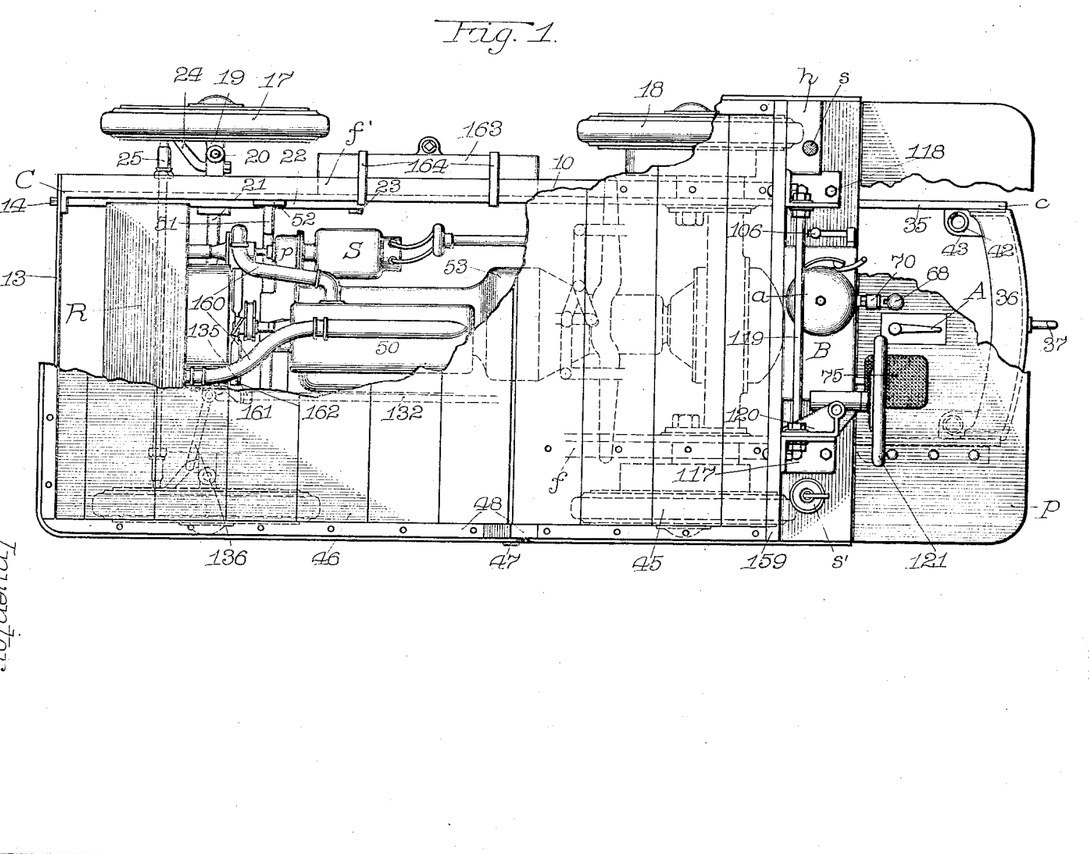
Figure 1 is a top plan view of a truck embodying the improvement of my invention, portions thereof being broken away.
Figure 2:
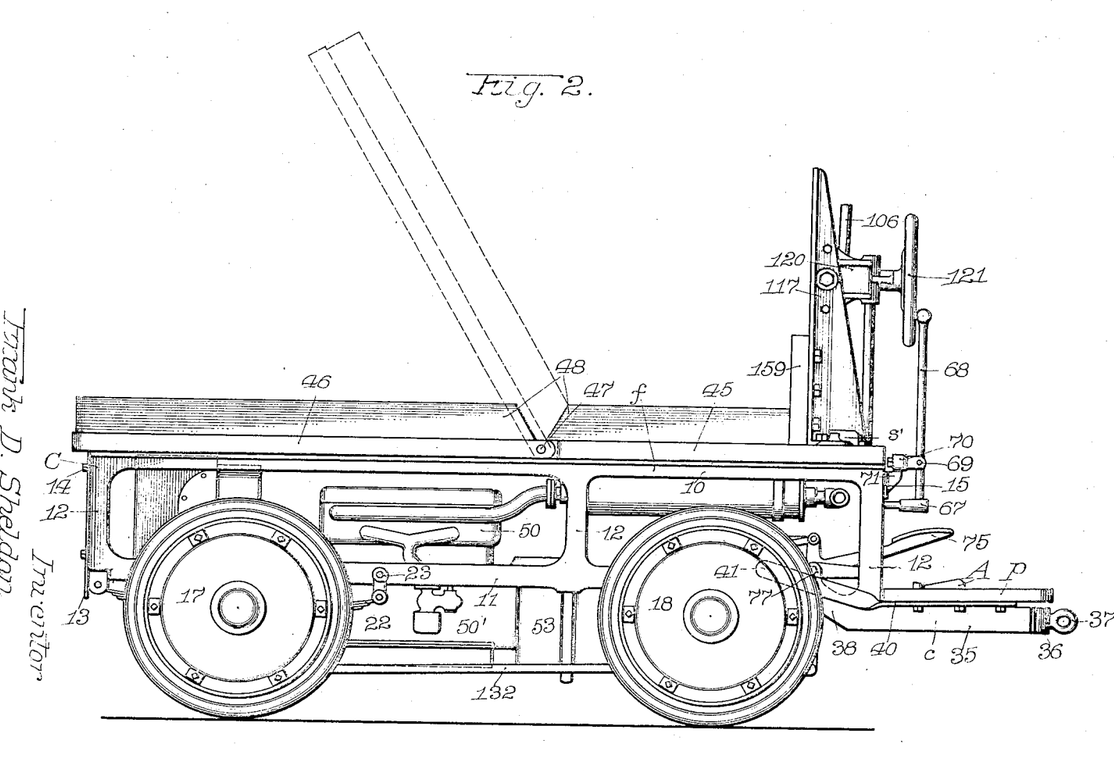
Fig. 2 is a left side elevation of the same.
Figure 3:
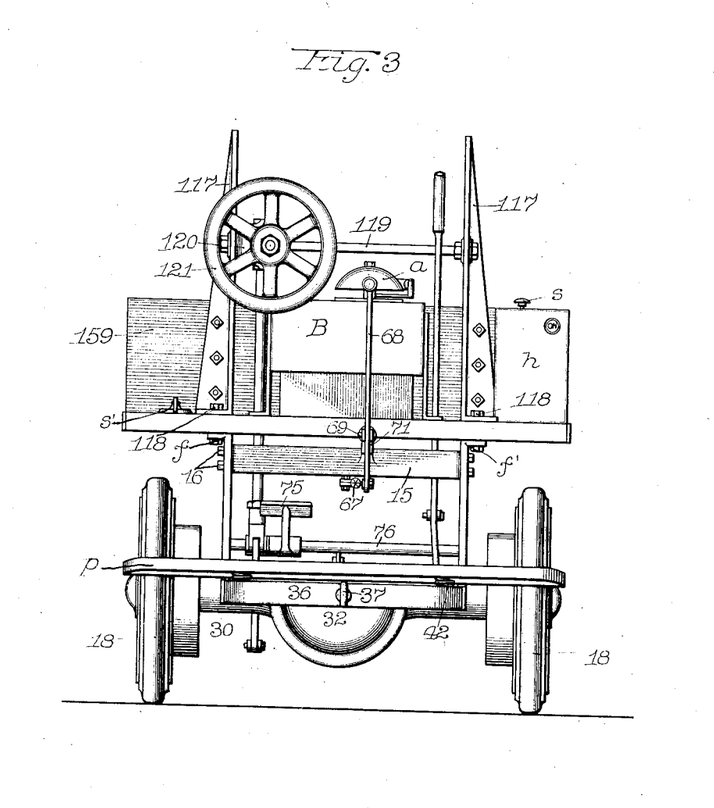
Fig. 3 is a rear end elevation of the same.

Referring now to the steering mechanism, I provide a pair of standards 117, said standards being preferably in the form of tapering angle irons bolted or otherwise secured as at 118 to the section 45 of the tractor body. The standards 117 support a transverse bar 119, which in turn supports a block 120. The bar 119 also serves as a reinforced beam for the standard and prevents undue vibration of the same. A steering wheel 121 is provided carried on a relatively short shaft, said shaft being mounted in a bearing 123 cast integrally with the block 120. A vertical bearing 124 is formed integrally with the block 120, the bore of said bearing communicating with the bore of the bearing 123. A rod is vertically reciprocable in the bearing 124, said rod 125 being formed with teeth 126, said teeth being engageable with teeth of a similar pitch designated 127 and formed in the short shaft 122. It will be readily apparent that upon a rotation of the wheel 121 in either direction, the rod 125 will be caused to vertically reciprocate. This movement is employed for steering the front wheels 17 through the medium of a bell crank lever 128 pivotally mounted at 129 on the bar 76. The short arm of the bell crank lever 128 is connected to the rod 125, an adjustable member 130 being associated with the rod for an obvious purpose. The connection of the member 130 with the short arm of the bell crank lever is pivotal as indicated at 131. A connecting rod 132 is provided which extends longitudinally of the truck, the rear end of the rod having an adjustable member 133 thereon pivotally connected at 134 with the free end of the longer arm of the bell crank lever 128. The front end of the rod 132 is provided with an adjustable member 135 shown in dotted lines in Fig. 1, said member being pivotally connected with an extension 136 rigidly associated with one of the arms 24 carried by the stub axle. Thus, it will be apparent that upon a vertical reciprocation of the rod 125, a longitudinal movement will be imparted to the rod 132 and this movement translated through the arms 24 and reach rod 25 will cause a shifting of the steering wheel 17 to change the direction of movement of the vehicle.

Figures 6, 7:
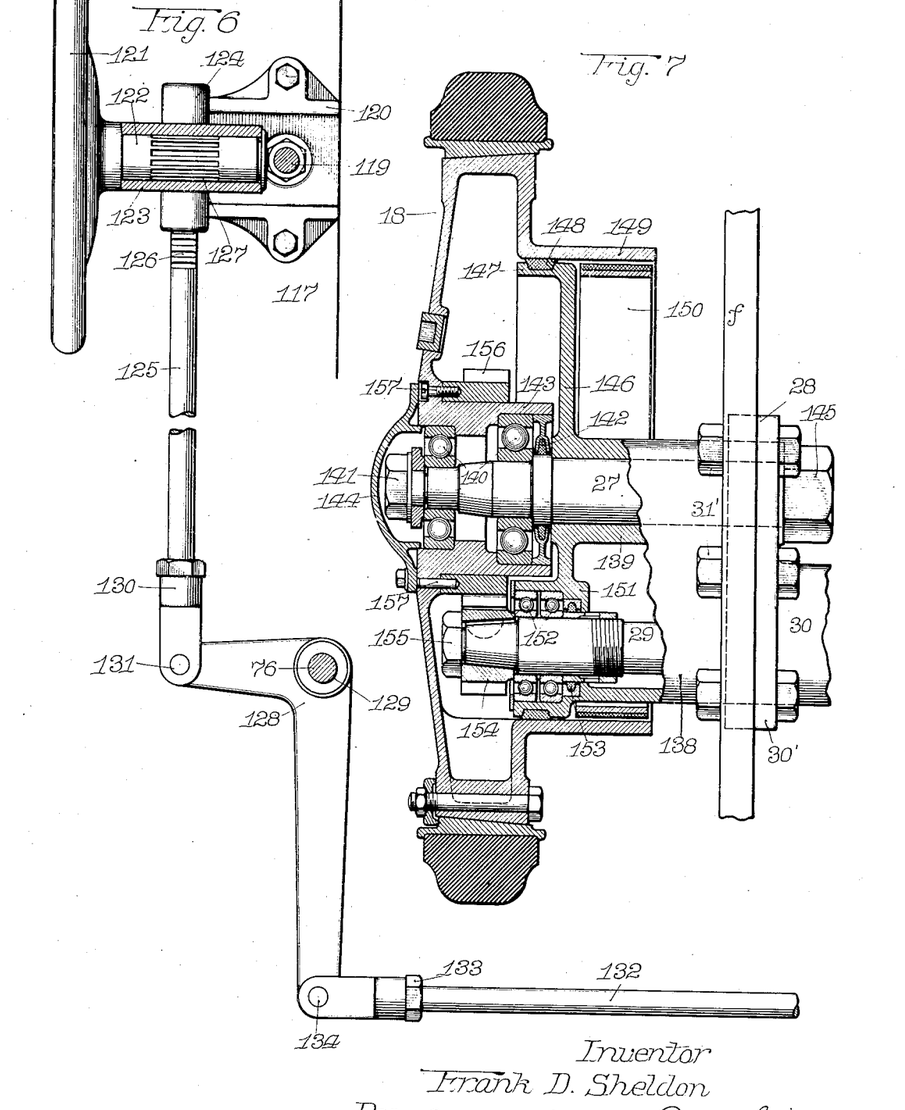
Fig. 6 is an enlarged detail of the steering wheel and steering rod.
Fig. 7 is an enlarged transverse section of one of the driving wheels and connection of the same to the driving axle.

Referring to the motion transmitting means employed between the driving axle 29 and the driving wheel and best shown in Fig. 7, I provide a stationary drum 138 preferably cast integrally with the axle housing 30. A flange 30' is formed on the housing 30 and bolts 31' serve to secure said flange to one of the lower panels of the side frames of the chassis. In view of the fact that the drums on both sides of the frame are identical, as well as the motion transmitting means for both driving wheels, I will describe in detail but one of the same.

As best shown in Fig. 7, the drum 138 is provided with a bearing sleeve 139 in which is stationarily mounted the spindle or short axle 27 on which is rotatably carried the driving wheel 18. Ball bearings 140 and retaining means 141 are associated with the spindle and driving wheel. An annular packing 142 prevents the ingress of dust to the bearings, said packing being carried by the hub 143 of the wheel. A dust cap 144 is removably mounted on the outer end of the hub. The spindle 27 projects through the flange 30' and is maintained against displacement by means of the nut 145. A partition 146 is cast integrally with the sleeve 139 and is provided with an annular flange 147 in which is disposed a dust packing 148, which packing is adapted to engage the inner peripheral surface of the brake drum 149, said drum being preferably cast integrally with the wheel body. The brake band is designated 150.

An eccentric bearing sleeve 151 is formed in the partition 146, said sleeve carrying ball bearings 152 which are adapted to receive and support the free end of the driving axle 29. A suitable packing 153 prevents dust from reaching said bearings 152.

Rotative motion of the axle 29 is imparted to the wheel by means of the pinion 154, said pinion being carried by the free end of the axle. A nut 155 prevents displacement of the pinion. Of course, it is to be understood that the pinion is keyed to said shaft and rotatable therewith. The pinion 154 meshes with a gear 156 carried by the hub 143, screws or the like fastening element 157 serving to prevent relative movement of the hub and gear. In the provision of my improved driving mechanism it will be apparent that the driving gear, bearings and all engaging and relatively movable surfaces are contained within a dust proof housing readily accessible when desired.

The ignition system of my improved truck may embody any of the approved forms now in common use. A storage battery housing is provided and designated B, said housing being disposed between the standards 117 at the rear of a protecting panel 159. A self starter S is provided which may be of any approved standard type. The self starter is controlled by means of a switch member s mounted on the top of a switch housing h carried on the panel 159.

The usual engine cooling method may be employed, the radiator being designated R, circulation being afforded by means of a rotary pump $p$ and connection between the radiator pump and cooling chamber of the engine being afforded by conduits 160 of the usual type. A funnel 161 is disposed rearwardly of the radiator and a fan element 162 is disposed adjacent the mouth of the funnel, said fan element performing the cooling function and being driven by the engine crank shaft. The fuel supply tank is designated 163 and is preferably mounted on one of the frames in this case, the frame $f'$ by means of straps 164.

A foot controlled lever A is mounted on the platform P and is suitably connected to the fuel supply for acceleration purposes. The ignition switch is designated S' and is mounted on the body adjacent one of the standards 117. A suitable alarm $a$ for warning persons of the approach of the truck may be provided.

The essential features of my invention and those features upon which I desire to lay particular stress reside more especially in primarily the disposition of the power plant and controlling mechanism entirely beneath the floor of the body of the vehicle in alinement with the center of the wheels, insuring a low center of gravity and a minimum danger of capsizing, location of the power plant entirely between the front and rear axle of the truck and the disposition of the line of draft whereby climbing of the front end of the device is rendered unlikely. It will be apparent that easy access may be had to the forward end of the power plant by simply raising the hinged portion of the body of the vehicle. It is preferred that the operator stand while driving, but, of course, if found practicable, a seat may be provided. Of course, the gearing is such that there may be two or three speeds forward and one reverse as is now common in the motor vehicle practice. I desire to lay particular stress upon the convenient manner in which the control and steering mechanism of the tractor are arranged, insuring efficient handling of the vehicle in close quarters. Attention is directed to the automatic feature of the clutch and brake, as well as the emergency feature embodied therewith.

Thus it will be seen that in the provision of my improved and novel motor vehicle I have designed a tractor capable of use in close quarters and particularly adapted to be utilized in industrial work, such as in factories, railway stations and the like, and while I have shown and described my invention as embodying specific forms of construction, I reserve the right to make such changes in said structure as do not depart from the spirit and scope of the invention as claimed.

I claim:

1. In a truck, the combination of a chassis mounted on driving and steering wheels, a body on said chassis having a flat object carrying upper surface unobstructed from end to end, a portion of said body being hinged, a power plant including an internal explosion engine and power transmission mechanism disposed wholly beneath said body.

2. In a truck, the combination of a chassis and driving and steering wheels, a body on said chassis having a flat upper surface unobstructed except for the steering wheel standards, an internal explosion engine for driving the truck and power transmission mechanism disposed wholly beneath said body.

3. In a truck, the combination of a chassis mounted on driving and steering wheels, an object carrying body on said chassis flat and without obstruction from end to end, a portion of said body being removable, an internal combustion engine disposed beneath said body in alinement with the wheel centers and transmission mechanism between said engine and driving wheels.

4. In a truck, the combination of a chassis and driving and steering wheels, a body on the chassis, a power plant disposed on the chassis wholly beneath the body, a sub chassis disposed in alinement with the wheel centers and adapted to carry an operator's platform, shock absorbing means under said platform.

5. In a truck, the combination of a chassis, driving and steering wheels, a body on the chassis, a power plant disposed beneath said body, steering mechanism disposed at one end of said chassis, and an operator's platform carried below the level of said body at the other end of said body.

6. In a truck, a chassis composed of side frames, and transverse tie bars, driving and steering wheels supporting said chassis, a body supported on the top of the chassis, a power plant beneath the body and in alinement with the wheel centers, a sub-chassis comprising an extension of said main chassis and disposed in the line of wheel centers, an operator's platform on said sub-chassis and steering and control mechanism disposed adjacent said platform.

7. In a truck, a chassis composed of side frames, a body on said chassis, a power plant disposed beneath the body, the lower rear ends of said frames being extended to form a sub-chassis, an operator's platform yieldably supported by said sub-chassis and means carried by said sub-chassis to which a trailer may be attached.

8. In a truck, the combination of a chassis having side frames composed of top and bottom panels connected by vertical posts, transverse tie-bars for said frames, driving and steering wheels supporting said chassis, a power plant carried by the chassis, the bottom panels of said frames being distorted and rearwardly extended to provide a sub-chassis in alinement with the wheel centers, and an operator's platform disposed on said sub-chassis.

In witness whereof, I hereunto subscribe my name this 6th day of January, A. D. 1917.

FRANK D. SHELDON.